(12) United States Patent
Santos et al.

(10) Patent No.: US 10,991,380 B2
(45) Date of Patent: Apr. 27, 2021

(54) GENERATING VISUAL CLOSED CAPTION FOR SIGN LANGUAGE

(71) Applicant: International Business Machines Corporation, Armonk, NY (US)

(72) Inventors: Reginaldo Marcelo Dos Santos, Hortolandia (BR); Breno H. Leitao, Araraquara (BR); Renata Balthazar de Lima Mussauer, Rio de Janeiro (BR)

(73) Assignee: International Business Machines Corporation, Armonk, NY (US)

( * ) Notice: Subject to any disclaimer, the term of this patent is extended or adjusted under 35 U.S.C. 154(b) by 116 days.

(21) Appl. No.: 16/354,912

(22) Filed: Mar. 15, 2019

(65) Prior Publication Data

US 2020/0294525 A1  Sep. 17, 2020

(51) Int. Cl.
| | |
|---|---|
| *G10L 21/10* | (2013.01) |
| *G10L 15/22* | (2006.01) |
| *G06T 13/40* | (2011.01) |
| *G06T 13/20* | (2011.01) |
| *G10L 15/26* | (2006.01) |
| *G10L 21/06* | (2013.01) |

(52) U.S. Cl.
CPC ............ *G10L 21/10* (2013.01); *G06T 13/205* (2013.01); *G06T 13/40* (2013.01); *G10L 15/22* (2013.01); *G10L 15/26* (2013.01); *G10L 2021/065* (2013.01)

(58) Field of Classification Search
None
See application file for complete search history.

(56) References Cited

U.S. PATENT DOCUMENTS

| | | | |
|---|---|---|---|
| 7,944,506 B2 | 5/2011 | Jeon | |
| 2002/0140718 A1* | 10/2002 | Yan | ............ G10L 21/06 715/706 |
| 2005/0168640 A1 | 8/2005 | Jeon | |
| 2006/0134585 A1 | 6/2006 | Adamo-Villani | |
| 2009/0012788 A1* | 1/2009 | Gilbert | ............ G10L 21/06 704/235 |
| 2010/0027765 A1 | 2/2010 | Schultz | |

(Continued)

FOREIGN PATENT DOCUMENTS

JP    2011175598 A    9/2011

OTHER PUBLICATIONS

"Signing Avatar With Cultural Characteristics", ip.com, IP.com No. IPCOM000216896D, IP.com Electronic Publication Date: Apr. 23, 2012, <https://priorart.ip.com/IPCOM/000216896>, 3 pages.

(Continued)

*Primary Examiner* — Douglas Godbold
(74) *Attorney, Agent, or Firm* — Joseph P Curcuru; Gilbert Harmon, Jr.

(57) ABSTRACT

Embodiments describe an approach for generating a sign language translation of an audio portion of a video. Embodiments receive a request for a sign language translation for a selected video and extract audio from the selected video. Additionally, embodiments, convert the extracted audio into text, identify contextual sounds in the audio, and convert the text and the contextual sounds into sign language content. Furthermore, embodiments, generate a sign language video based on the sign language content, and display the sign language video in a separate display window on the selected video.

20 Claims, 3 Drawing Sheets

(56) References Cited

U.S. PATENT DOCUMENTS

| | | | | |
|---|---|---|---|---|
| 2011/0283865 A1* | 11/2011 | Collins | ............... | G06F 3/04817 |
| | | | | 84/464 R |
| 2014/0046661 A1* | 2/2014 | Bruner | .................... | G06F 40/56 |
| | | | | 704/235 |
| 2014/0324428 A1* | 10/2014 | Farraro | ................... | G10L 15/22 |
| | | | | 704/244 |
| 2018/0365940 A1* | 12/2018 | Menard | .................... | G08B 6/00 |

OTHER PUBLICATIONS

"The American Sign Language Avatar Project at DePaul University", <http://asl.cs.depaul.edu/>, printed Jan. 25, 2019, 2 pages.

Oh et al., "Avatar-Based Sign Language Interpretations for Weather Forecast and Other TV Programs", IBC, Mar. 24, 2017, <https://www.ibc.org/consumption/avatar-based-sign-language-interpretation-for-weather-forecast-and-other-tv-programs/1033.article>, 4 pages.

Ozer, Jan "Closed Captioning for Streaming Media", streamingmedia.com, Streaming Media Magazine, posted on Nov. 16, 2012, <http://www.streamingmedia.com/Articles/ReadArticle.aspx?ArticleID=86217&PageNum=2>, 4 pages.

Zee, Samantha, "Whose Sign Is It Anyway? AI Translates Sign Language Into Text", NVIDIA, <https://blogs.nvidia.com/blog/2017/05/11/ai-translates-sign-language/>, May 11, 2017, 4 pages.

\* cited by examiner

GENERATING VISUAL CLOSED CAPTION FOR SIGN LANGUAGE

BACKGROUND

The present invention relates generally to the field of video streaming accessibility, and more particularly to computer generated closed captions for sign language.

According to the World Health Organization (WHO), over five percent of the world's population suffers from disabling hearing loss. Five percent may seem like a small number; however, that total number of people suffering from hearing disabilities is over 360 million people across the globe. Many hearing-impaired people communicate using text or sign language. Sign languages (also known as signed languages) are languages that use the visual-manual modality to convey meaning. Language is expressed via the manual sign stream in combination with non-manual elements. Sign languages are full-fledged natural languages with their own grammar and lexicon. Accordingly, sign languages are not universal and are not mutually intelligible, although there are striking similarities among sign languages. Linguists consider both spoken and signed communication to be types of natural language, i.e., both emerged through an abstract, protracted aging process and evolved over time without meticulous planning. Sign language should not be confused with body language, a type of nonverbal communication.

Wherever communities of hearing-impaired people exist, sign languages have developed as handy means of communication and form the core of local deaf communities. Although signing is used primarily by the deaf and hard of hearing, signing is also used by hearing individuals, such as those unable to physically speak, those who have trouble with spoken language due to a disability or condition (augmentative and alternative communication), and those with deaf family members, such as children of deaf adults. It is unclear how many sign languages currently exist worldwide. Each country generally has its own, native sign language, and some have more than one. Currently, there are approximately 137 sign languages. Some sign languages have obtained some form of legal recognition while others have no status at all. Linguists distinguish natural sign languages from other systems that are precursors to them or derived from them, such as invented manual codes for spoken languages, home sign, "baby sign", and signs learned by non-human primates. When it comes to watching television shows, movies, and streaming videos online, the primary source assisting those with hearing disabilities is closed captioning.

Closed captioning (CC) and subtitling are both processes of displaying text on a television, video screen, or other visual display to provide additional or interpretive information. Both are typically used as a transcription of the audio portion of a program as it occurs (either verbatim or in edited form). Both can sometimes include descriptions of non-speech elements. Other uses of CC have been to provide a textual alternative language translation of a presentation's primary audio language that is usually burned-in (or "open") to the video and un-selectable. Hypertext Markup Language (HTML) defines subtitles as a "transcription or translation of the dialogue . . . when sound is available but not understood" by the viewer (e.g., dialogue in a foreign language) and captions as a "transcription or translation of the dialogue, sound effects, relevant musical cues, and other relevant audio information . . . when sound is unavailable or not clearly audible" (e.g., when audio is muted or the viewer is deaf or hard of hearing).

SUMMARY

Embodiments of the present invention disclose a method, a computer program product, and a system for generating a sign language translation of an audio portion of a video, the method comprising: receiving, by one or more processors, a request for a sign language translation for a selected video; extracting, by the one or more processors, audio from the selected video; converting, by the one or more processors, the extracted audio into text; identifying, by the one or more processors, contextual sounds in the audio; converting, by the one or more processors, the text and the contextual sounds into sign language content; generating, by the one or more processors, a sign language video based on the sign language content; and displaying, by the one or more processors, the sign language video in a separate display window on the selected video.

DETAILED DESCRIPTION

Embodiments of the present invention recognize that users with hearing disabilities have difficulty accessing video content whether it's pre-recorded videos or live videos. In enterprises, language is a barrier to contacts with foreign-speaking customers, partners, employees, colleagues, collaborators, foreign counterparts, etc. Human interpreters provide a way of addressing language differences in live meetings or big conferences, but with the advent of the internet and home-based video production, it is not economically feasible for a home-based video producer to have access to an interpreter. The vast majority of videos produced, whether for leisure or for education, are produced by home-based video producers. Sign language, unlike textual communication, can convey emotion and the message behind a video's intent. Additionally, presenting CC on a live event might not work without prior review. It should be noted that textual communication can mean any type of written text known in the art.

Embodiments, of the present invention can improve the computer technology of computer implemented closed captions by making closed captions more accessible to users with hearing disabilities. Embodiments of the present invention can translate spoken words (e.g., dialog) from a video, either recorded or broadcasted live, into sign language using one or more avatars rendered on the screen of the display device (e.g. a laptop or a smartphone) that sign the spoken words. In various embodiments, the one or more avatars can be opt-in avatars. For example, a user selects to (opt-in) have one or more avatars generated. In another example, the user selects to (opt-out) not have any avatars generated. Embodiments of the present invention can generate a sign language content of a video and display the generated sign language translation in a floating box (e.g., video overlay) with a sign language animation (e.g., an avatar) to present (e.g., sign) the translated content.

Furthermore, embodiments of the present invention can improve the computer technology of computer implemented closed captions by using a two-level renderization process of audio-to-text and text-to-avatar. The first level translation is contextual (e.g., context) based similar to 'analytical text' and the second level provides a flexible translation that is not tied to grammar and syntax rules. Embodiments of the present invention can generate two opt-in avatars, a first avatar handles the spoken words portion of audio extracted from a video, and the second avatar handles the background sounds portion of the audio extracted from the video. It should be noted that the term sign language can mean any form and/or variation of sign language known in the art.

Figure 1:
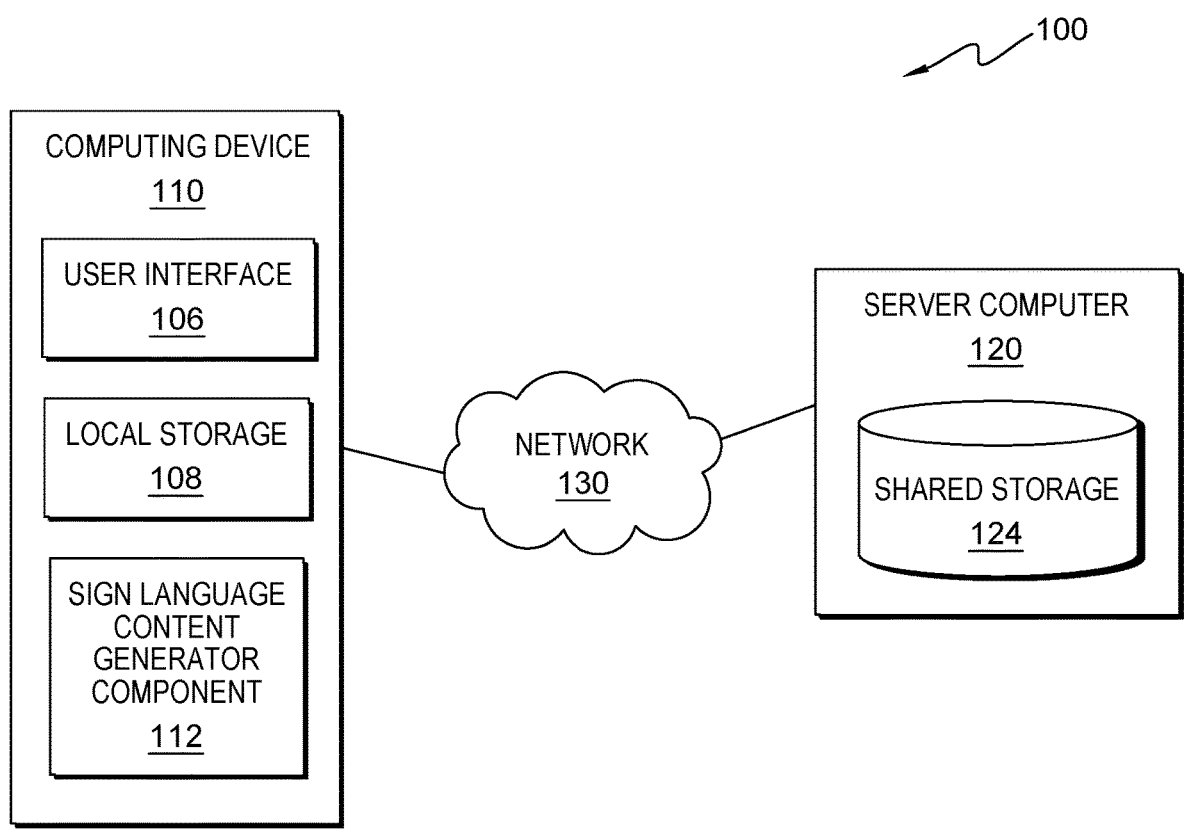
FIG. 1 is a functional block diagram illustrating a distributed data processing environment, in accordance with an embodiment of the present invention.

The present invention will now be described in detail with reference to the figures. FIG. 1 is a functional block diagram illustrating a distributed data processing environment, generally designated 100, in accordance with one embodiment of the present invention. The term "distributed" as used in this specification describes a computer system that includes multiple, physically distinct devices that operate together as a single computer system. FIG. 1 provides an illustration of one implementation and does not imply any limitations with regard to the environments in which different embodiments may be implemented. Many modifications to the depicted environment may be made by those skilled in the art without departing from the scope of the invention as recited by the claims. Distributed data processing environment 100 includes server computer 120 and computing device 110 interconnected over network 130.

Network 130 can be, for example, a storage area network (SAN), a telecommunications network, a local area network (LAN), a wide area network (WAN), such as the internet, a wireless technology for exchanging data over short distances (using short-wavelength ultra-high frequency (UHF) radio waves in the industrial, scientific and medical (ISM) band from 2.4 to 2.485 GHz from fixed and mobile devices, and building personal area networks (PANs) or a combination of the three), and can include wired, wireless, or fiber optic connections. Network 130 can include one or more wired and/or wireless networks that can receive and transmit data, voice, and/or video signals, including multimedia signals that include voice, data, text and/or video information. In general, network 130 can be any combination of connections and protocols that will support communications between computing device 110, sign language content generator component (SLCGC) 112, shared storage 124, and server computer 120, and any other computing devices and/or storage devices (not shown in FIG. 1) within distributed data processing environment 100.

Server computer 120 can be a standalone computing device, a management server, a web server, a mobile computing device, one or more client servers, or any other electronic device or computing system capable of receiving, sending, and processing data. In other embodiments, server computer 120 can represent a server computing system utilizing multiple computers such as, but not limited to, a server system, such as in a cloud computing environment. In another embodiment, server computer 120 can represent a computing system utilizing clustered computers and components (e.g., database server computers, application server computers, etc.) that act as a single pool of seamless resources when accessed within distributed data processing environment 100. In the depicted embodiment, sever computer 120 can include shared storage 124. Server computer 120 can include internal and external hardware components, as depicted, and described in further detail with respect to FIG. 3.

In various embodiments, computing device 110 can be, but is not limited to, a standalone device, a client, a server, a laptop computer, a tablet computer, a netbook computer, a personal computer (PC), a smart phone, a desktop computer, a smart television, a smart watch, a radio, a stereo system, a cloud based service (e.g., a cognitive cloud based service), and/or any programmable electronic computing device capable of communicating with various components and devices within distributed data processing environment 100, via network 130 or any combination therein. In general, computing device 110 can be representative of any programmable computing device or a combination of programmable computing devices capable of executing machine-readable program instructions and communicating with users of other computing devices via network 130, capable of executing machine-readable program instructions and communicating with server computer 120. Server computer 120 can include internal and external hardware components, as depicted, and described in further detail with respect to FIG. 3.

In other embodiments, computing device 110 can represent any programmable electronic computing device or combination of programmable electronic computing devices capable of executing machine readable program instructions, manipulating executable machine-readable instructions, and communicating with server computer 120 and other computing devices (not shown) within distributed data processing environment 100 via a network, such as network 130. In the depicted embodiment, computing device 110 can include user interface (UI) 106 and local storage 108. In various embodiments, not depicted in FIG. 1, computing device 110 can have one or more user interfaces. In other embodiments, not depicted in FIG. 1, environment 100 can comprise one or more computing devices, one or more server computers, and/or one or more networks. In the depicted embodiment, computing device 110 houses SLCGC 112.

User interface (UI) 106 provides an interface to SLCGC 112 via network 130 for a user of computing device 110. In various embodiments, UI 106 can enable a user to interact with SLCGC 112, computing device 110, server computer 120, or any combination thereof. For example, a computer system and display screen enabling a user to send program instructions, receive program instructions, send messages, receive messages, update data, send data, input data, edit data, collect data, receive data, or any combination thereof from a server or a program. In another example, UI 106 enables a user to interact and/or view online videos. In one embodiment, UI 106 can be a graphical user interface (GUI) or a web user interface (WUI) and can display text, documents, web browser windows, user options, application interfaces, and instructions for operation. UI 106 can include information such as graphic, text, and sound. UI 106 can enable a program to be presented to a user and enable control sequences the user employs to control the program. In another embodiment, UI 106 can be a mobile application software providing an interface between a user of computing device 110 and server computer 120. Mobile application software, or an "app," can be a computer program designed to run on smart phones, tablet computers and other computing devices. In an embodiment, UI 106 can enable the user of computing device 110 to send data, input data, edit data (annotations), collect data and/or receive data.

Each of shared storage 124 and local storage 108 can be a data/knowledge repository and a database that can be written and read by one or a combination of SLCGC 112, server computer 120, and computing device 110. In the depicted embodiment, shared storage 124 resides on server computer 120 and local storage 108 resides on computing device 110. In another embodiment, shared storage 124 and local storage 108 can each reside elsewhere within distributed data processing environment 100, provided that each can access at least one of computing device 110 and server computer 120 and each are accessible by at least one of computing device 110 and server computer 120. Shared storage 124 and local storage 108 can each be implemented with any type of storage device capable of storing data and configuration files that can be accessed and utilized by server computer 120, computing device 110, or any combination thereof, such as, but not limited to, a database server, a hard disk drive, or a flash memory. In other embodiments, shared storage 124 and local storage 108 can each be a hard drive, a memory card, a computer output to laser disc (cold storage), or any form of data storage known in the art. In some embodiments, shared storage 124 and local storage 108 can each be one or more cloud storage systems or databases linked to a cloud network (not shown).

SLCGC 112 operates to translate audio associated with a video into sign language, generate a graphic rendered avatar that performs the translated audio, and display the avatar on a video overlay of the video. In the depicted embodiment, SLCGC 112 is stored on computing device 110. In various embodiments, not depicted in FIG. 1, SLCGC 112 can be housed on server computer 120 or housed anywhere within distributed data processing environment 100 as long as SLCGC 112 is interconnected to computing device 110 and server computer 120 through network 130. In other embodiments, not depicted in FIG. 1, SLCGC 112 can be a standalone component that can be anywhere within distributed data processing environment 100 as long as SLCGC 112 is interconnected to computing device 110 and server computer 120 through network 130. In some embodiments, SLCGC 112 can be an application or an add on tool/gadget on computing device 110.

In various embodiments, SLCGC 112 can translate audio from live or pre-recorded videos into sign language. In various embodiments, SLCGC 112 can utilize natural language artificial intelligence (AI) capabilities to extract audio from a video online (e.g., a pre-recorded video or a video from an online streaming service) or a live video (e.g., a live broadcast). In various embodiments, SLCGC 112 can process extracted audio utilizing a speech to text function, not depicted in FIG. 1, to generate text (e.g., a text translation) for a selected video (e.g., a video selected by the user to view). In various embodiments, SLCGC 112 can generate sign language content (e.g., sign language translation) of a selected video by extracting and translating the audio of the selected video into text, and then translating the text into equivalent sign language content (e.g., a user designated sign language translation). For example, SLCGC 112 translating text from extracted audio of a selected video into American Sign Language (ASL). It should be noted that sign language content can be, but is not limited to, a sign language translation of audio, text, a combination of both audio and text, or any sign language translation known in the art. In various embodiments, sign language content can be generated into an animation or video, in which the animation or video features one or more generated avatars signing the sign language translation. In some embodiments, the sign language content can comprise the emotional context of the audio translation, text translation, and/or contextual sounds identified in the audio and/or text.

In various embodiments, SLCGC 112 can perform audio analytics on extracted audio from a selected video to identify contextual sounds that are relevant to convey the selected video message. For example, SLCGC 112 performs audio analytics on a selected video and identifies a crowd cheering in the background. In another example, SLCGC 112 performs audio analytics on another selected video and identifies sirens blaring in the distance. In one embodiment, the identified contextual sounds from the extracted audio are translated into text and then into sign language content. In various embodiments, SLCGC 112 can display the sign language content using one or more visual elements. In some particular embodiments, SLCGC 112 uses one or more avatars as the visual elements to display the generated sign language content. In some embodiments, the one or more avatars can be one or more persons. In other embodiments, the one or more avatars can be one or more computer generated characters, cartoons, animals, etc. In other embodiments, an avatar can be a set virtual hands that signs the generated sign language content. In various embodiments, one or more avatars are used to reproduce the sign language content (e.g., sign language translation) to the user. For example, SLCGC 112 instructs a first avatar to sign the text translated from the spoken words from the extracted audio of the selected video and instructs a second avatar to sign the identified contextual sounds from the extracted audio of the selected video.

In various embodiments, SLCGC 112 can comprise avatar settings that enable a user to select and customize/personalize an avatar. For example, SLCGC 112 enables a user to select: the type of avatar (e.g., human, animal, cartoon, etc.), gender of the avatar, the facial features of the avatar, the avatar's hair style, the avatar's clothing style, and/or any other form of customization or personalization. In various embodiments, the avatar settings can enable a user to opt-in or opt-out of having one or more avatars generated. For example, a user selects to (opt-in) have only two avatars generated. In another example, the user selects to (opt-out) not have any avatars generated. In some embodiments, SLCGC 112 can automatically generate random human-like avatars to perform the generated sign language content. In some embodiments, SLCGC 112 can automatically generate avatars that correlate to and match characters in the translated text from the extracted audio of the selected video (e.g., generate avatars that match the characters' description in the extracted audio). For example, if the selected video comprises two characters, in which one character is a male and the other character is a female, SLCGC 112 can generate one male avatar and one female avatar. In another embodiment, if the selected video is a first responder training video, SLCGC 112 can generate an avatar that resembles a paramedic, an avatar that resembles a police officer, and an avatar that resembles a fire fighter.

In various embodiments, SLCGC 112 can generate one or more known characters of a particular movie or television show to perform the generated sign language content. For example, the user selects a video clip from a blockbuster movie, wherein the super villain and popular superhero are having a dialog. In this particular example, SLCGC 112 can generate an avatar of both the super villain and the popular superhero to sign their own lines. In various embodiments, SLCGC 112 can designate which avatar is performing the generated sign language content by placing an indicator (e.g., a speech indicator) on, near, or surrounding one or more of the avatars. In various embodiments, the speech indicator can notify a user and/or indicate to a user which of the avatars is signing (e.g., speaking). For example, when an avatar is signing, the avatar's hands have a highlight glow around them. In another example, when an avatar is signing, the avatar will have a talking bubble displayed. In yet another example, the avatar will have a talking bubble that can display virtual hands signing the generated sign language content.

In various embodiments, SLCGC 112 can implement the emotional context in the extracted audio into facial expressions of one or more avatars. For example, SLCGC 112 identifies that context of the text is sad and somber, so SLCGC 112 instructs the avatar's face to be sad. In various embodiments, SLCGC 112 can instruct the one or more avatars to display the emotional context using body language. For example, a portion of the sign language content is a character yelling in anger in the selected video. In this particular example, SLCGC 112 will instruct the avatar to sign the sign language content angrily and vigorously to portray the angry tone of the selected video. In various embodiments, SLCGC 112 can provide the ability for a user, via the avatar settings, to enable or disable the one or more avatars, select which type of avatar, select the amount of facial expression the user wants the avatar to express, and the amount of body motion the user wants the avatar to express. In various embodiments, SLCGC 112 can have sign language settings and enable a user to edit the sign language settings. In various embodiments, sign language settings can enable a user to select whether or not to generate one or more avatars, enable a user to select whether or not to enable sign language translation, enable a user to select the type of avatar, enable a user to select a sign language preference (e.g., American Sign Language), and enable a user to customize one or more avatars.

In various embodiments, SLCGC 112 can embed the generated sign language content into the selected video. In some embodiments, SLCGC 112 can embed the sign language content into the selected video and display the sign language content as a video overlay on the selected video, so the user can view the selected video and the generated sign language content simultaneously. For example, SLCGC 112 generates sign language content for a selected video and displays the sign language content as a video in a separate window within the selected video. In some embodiments, SLCGC 112 can enable a user to edit the embedded video (i.e., the displayed sign language content). For example, SLCGC 112 enables a user to move the embedded video anywhere on computing device 110, minimize or maximize the embedded video, adjust the size of the embedded video, or any combination thereof.

Figure 2:
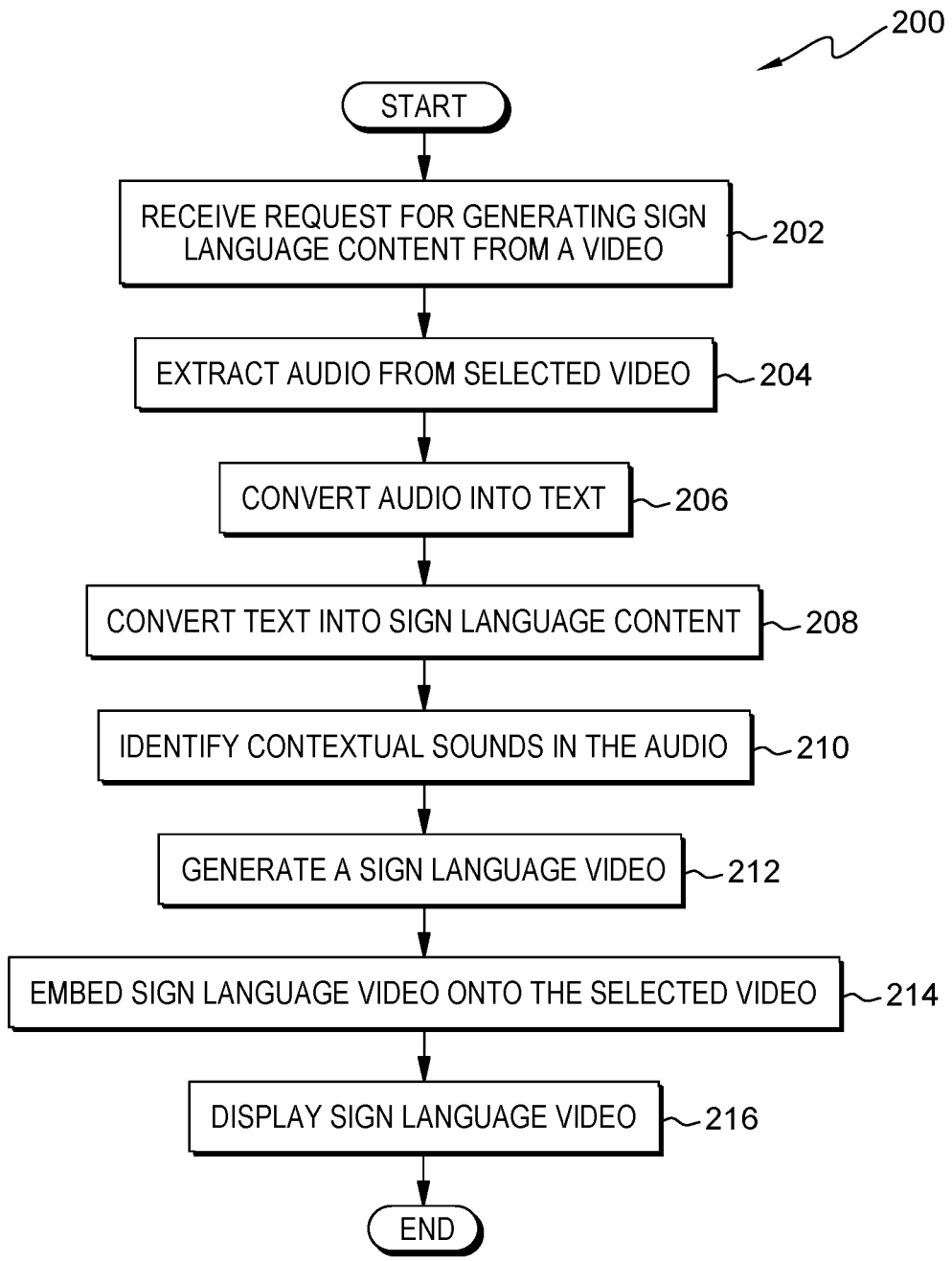
FIG. 2 is a flow chart illustrating operational steps of a sign language content generator component, on a computing device within the data processing environment of FIG. 1, for generating visual closed caption using sign language, in accordance with an embodiment of the present invention.

FIG. 2 is a flow chart illustrating operational steps of SLCGC 112, on computing device 110 within distributed data processing environment 100 of FIG. 1, for generating visual closed captions using sign language. FIG. 2 provides an illustration of one implementation and does not imply any limitations with regard to the environments in which different embodiments can be implemented. Many modifications to the depicted environment can be made by those skilled in the art without departing from the scope of the invention as recited by the claims.

In step 202, SLCGC 112 receives a request for generation of sign language content from a video. In various embodiments, SLCGC 112 can receive a request from a user or automatically from a video content provider to translate audio from a video selected by the user into sign language. In various embodiments, the selected video can be a live broadcast (e.g., a meeting or a live television show) or a pre-recorded video.

In step 204, SLCGC 112 extracts the audio from the selected video. In various embodiments, SLCGC 112 can extract the audio from the selected video using one or more natural language AI's.

In step 206, SLCGC 112 converts the audio into text. In various embodiments, SLCGC 112 can convert the audio extracted from the selected video into text. In various embodiments, SLCGC 112, via the one or more natural language AI's, uses speech to text to translate the content of the selected video. In various embodiments, the text can be translated into a script format similar to CC. In various embodiments, the text translation can include the emotional context of the selected video (e.g., the emotional content and contextual meaning of the text).

In step 208, SLCGC 112 converts the text into sign language content. In various embodiments, SLCGC 112 can convert the text into sign language and generate sign language content, in which the sign language content represents the extracted audio content of the selected video.

In step 210, SLCGC 112 identifies contextual sounds. In various embodiments, SLCGC 112 can identify one or more contextual sounds in the extracted audio from the selected video. In various embodiments, SLCGC 112 can translate the one or more identified contextual sounds into sign language content.

In step 212, SLCGC 112 generates a sign language video. In various embodiments, SLCGC 112 can generate a sign language video based on the generated sign language content and the identified contextual sounds from the selected video. In various embodiments, the generated sign language video comprises generating one or more opt-in avatars based on the generated sign language content and the identified contextual sounds from the selected video. In various embodiments, the generated sign language video comprises one or more opt-in avatars that perform the sign language based on the sign language content and the identified contextual sounds from the selected video.

In step 214, SLCGC 112 embeds the sign language video into the selected video. In various embodiments, SLCGC 112 can embed the generated sign language video into the selected video.

In step 216, SLCGC 112 displays the sign language video. In various embodiments, SLCGC 112 can display the generated sign language video in a separate window (e.g., display window) on the selected video. In various embodiments, SLCGC 112 can enable a user to edit the display window. For example, a user can maximize or minimize the display window, adjust the display window size, move the display window, etc.

Figure 3:
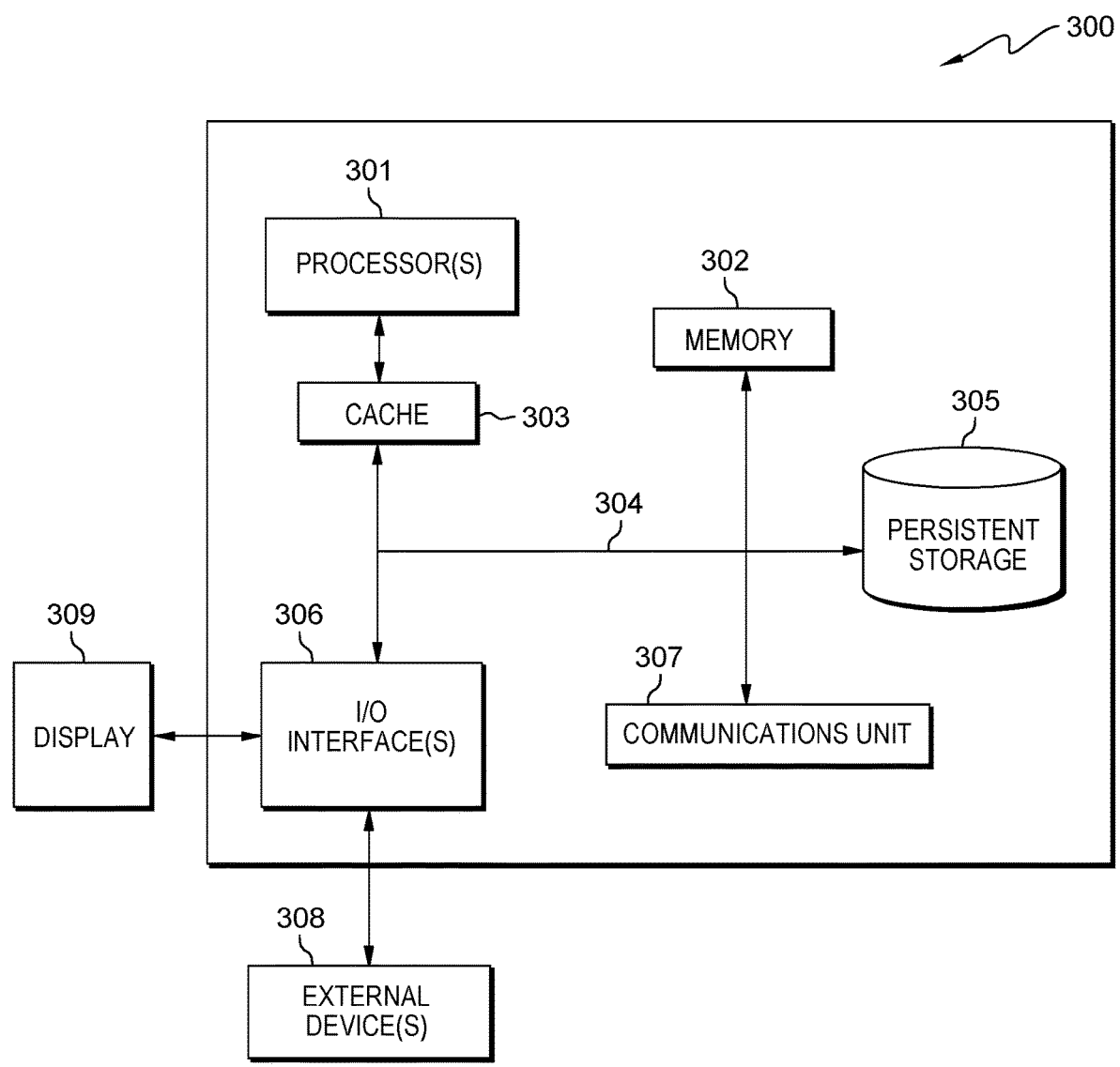
FIG. 3 depicts a block diagram of components of the server computer executing the automated online feedback component within the distributed data processing environment of FIG. 1, in accordance with an embodiment of the present invention.

FIG. 3 depicts a block diagram of components of computing device 110 and server computer 120 executing SLCGC 112 within distributed data processing environment 100 of FIG. 1, in accordance with an embodiment of the present invention. It should be appreciated that FIG. 3 provides only an illustration of one implementation and does not imply any limitations with regard to the environments in which different embodiments can be implemented. Many modifications to the depicted environment can be made.

FIG. 3 depicts computer system 300, in which computing device 110 and server computer 120 represent examples of computer system 300 SLCGC. The computer system includes processors 301, cache 303, memory 302, persistent storage 305, communications unit 307, input/output (I/O) interface(s) 306, display 309, external device(s) 308 and communications fabric 304. Communications fabric 304 provides communications between cache 303, memory 302, persistent storage 305, communications unit 307, and input/output (I/O) interface(s) 306. Communications fabric 304 can be implemented with any architecture designed for passing data and/or control information between processors (such as microprocessors, communications, and network processors, etc.), system memory, peripheral devices, and any other hardware components within a system. For example, communications fabric 304 can be implemented with one or more buses or a crossbar switch.

Memory 302 and persistent storage 305 are computer readable storage media. In this embodiment, memory 302 includes random access memory (RAM). In general, memory 302 can include any suitable volatile or non-volatile computer readable storage media. Cache 303 is a fast memory that enhances the performance of processors 301 by holding recently accessed data, and data near recently accessed data, from memory 302.

Program instructions and data used to practice embodiments of the present invention can be stored in persistent storage 305 and in memory 302 for execution by one or more of the respective processors 301 via cache 303. In an embodiment, persistent storage 305 includes a magnetic hard disk drive. Alternatively, or in addition to a magnetic hard disk drive, persistent storage 305 can include a solid-state hard drive, a semiconductor storage device, read-only memory (ROM), erasable programmable read-only memory (EPROM), flash memory, or any other computer readable storage media that is capable of storing program instructions or digital information.

The media used by persistent storage 305 can also be removable. For example, a removable hard drive can be used for persistent storage 305. Other examples include optical and magnetic disks, thumb drives, and smart cards that are inserted into a drive for transfer onto another computer readable storage medium that is also part of persistent storage 305.

Communications unit 307, in these examples, provides for communications with other data processing systems or devices. In these examples, communications unit 307 includes one or more network interface cards. Communications unit 307 can provide communications through the use of either or both physical and wireless communications links. Program instructions and data used to practice embodiments of the present invention can be downloaded to persistent storage 305 through communications unit 307.

I/O interface(s) 306 enables for input and output of data with other devices that can be connected to each computer system. For example, I/O interface 306 can provide a connection to external devices 308 such as a keyboard, keypad, a touch screen, and/or some other suitable input device. External devices 308 can also include portable computer readable storage media such as, for example, thumb drives, portable optical or magnetic disks, and memory cards. Software and data used to practice embodiments of the present invention can be stored on such portable computer readable storage media and can be loaded onto persistent storage 305 via I/O interface(s) 306. I/O interface(s) 306 also connect to display 309.

Display 309 provides a mechanism to display data to a user and can be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the internet using an Internet Service Provider (ISP)). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for generating a sign language translation of an audio portion of a video, the method comprising:
   extracting, by the one or more processors, audio from the selected video;
   converting, by the one or more processors, the extracted audio into text;
   identifying, by the one or more processors, contextual sounds in the audio;
   converting, by the one or more processors, the text and the contextual sounds into sign language content;
   generating, by the one or more processors, a sign language video based on the sign language content, wherein generating the sign language video further comprises:
      generating, by the one or more processors, a first avatar and a second avatar, wherein the first avatar signs a sign language translation of the text and the second avatar signs the identified contextual sounds; and
   displaying, by the one or more processors, the sign language video in a separate display window on the selected video.

2. The method of claim 1, further comprising:
   embedding, by the one or more processors, the sign language video into the selected video.

3. The method of claim 1, wherein the first avatar and the second avatar are opt-in avatars, and the first avatar and second avatar are customizable.

4. The method of claim 3, wherein the first avatar and second avatar display a speech indicator that notifies a user which avatar is speaking.

5. The method of claim 1, wherein the generated sign language video further comprises:
   generating, by the one or more processors, one or more avatars, wherein the one or more avatars correspond to a characters in the extracted audio.

6. The method of claim 1, wherein the generated sign language content is American sign language.

7. The method of claim 1, further comprising:
   receiving, by one or more processors, a request for a sign language translation for a selected video.

8. A computer program product for generating a sign language translation of an audio portion of a video, the computer program product comprising:
   one or more computer readable storage devices and program instructions stored on the one or more computer readable storage devices, the stored program instructions comprising:
   program instructions to extract audio from the selected video;
   program instructions to convert the extracted audio into text;
   program instructions to identify contextual sounds in the audio;
   program instructions to convert the text and the contextual sounds into sign language content;

program instructions to generate a sign language video based on the sign language content, wherein generating the sign language video further comprises:
program instructions to generate a first avatar and a second avatar, wherein the first avatar signs a sign language translation of the text and the second avatar signs the identified contextual sounds; and
program instructions to display the sign language video in a separate display window on the selected video.

9. The computer program product of claim 8, further comprising:
program instructions to embed the sign language video into the selected video.

10. The computer program product of claim 8, wherein the first avatar and the second avatar are opt-in avatars, and the first avatar and second avatar are customizable.

11. The computer program product of claim 10, wherein the first avatar and second avatar display a speech indicator that notifies a user which avatar is speaking.

12. The computer program product of claim 8, wherein the generated sign language video further comprises:
program instructions to generate one or more avatars, wherein the one or more avatars respectively correspond to a character in the extracted audio.

13. The computer program product of claim 8, wherein the generated sign language content is American sign language.

14. The computer program product of claim 8, further comprising:
program instructions to receive a request for a sign language translation for a selected video.

15. A computer system for generating a sign language translation of an audio portion of a video, the computer system comprising:
one or more computer processors;
one or more computer readable storage devices;
program instructions stored on the one or more computer readable storage devices for execution by at least one of the one or more computer processors, the stored program instructions comprising:
program instructions to extract audio from the selected video;
program instructions to convert the extracted audio into text;
program instructions to identify contextual sounds in the audio;
program instructions to convert the text and the contextual sounds into sign language content;
program instructions to generate a sign language video based on the sign language content, wherein generating the sign language video further comprises:
program instructions to generate a first avatar and a second avatar, wherein the first avatar signs a sign language translation of the text and the second avatar signs the identified contextual sounds; and
program instructions to display the sign language video in a separate display window on the selected video.

16. The computer system of claim 15, further comprising:
program instructions to embed the sign language video into the selected video.

17. The computer system of claim 15, wherein the first avatar and the second avatar are opt-in avatars, the first avatar and second avatar are customizable, and the first avatar and second avatar display a speech indicator that notifies a user which avatar is speaking.

18. The computer system of claim 15, wherein the generated sign language video further comprises:
program instructions to generate one or more avatars, wherein the one or more avatars correspond to a characters in the extracted audio.

19. The computer system of claim 15, wherein the generated sign language content is American sign language.

20. The computer system of claim 15, further comprising:
program instructions to receive a request for a sign language translation for a selected video.

* * * * *